US012656181B2

(12) United States Patent　　(10) Patent No.:　US 12,656,181 B2

Gadelrab et al.　　(45) Date of Patent:　Jun. 16, 2026

(54) NON-INVASIVE DIMENSIONAL THERMAL FLUID MAPPING SYSTEMS AND METHODS

(71) Applicant: Robert Bosch GmbH, Stuttgart (DE)

(72) Inventors: Karim Gadelrab, Boston, MA (US); Lei Cheng, Sunnyvale, CA (US); Jonathan Braaten, Sunnyvale, CA (US); Peter Lindner, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 642 days.

(21) Appl. No.: 18/115,329

(22) Filed: Feb. 28, 2023

(65) Prior Publication Data

US 2024/0288312 A1　　Aug. 29, 2024

(51) Int. Cl.
　　*G01J 5/48*　　(2022.01)
　　*G01J 5/00*　　(2022.01)
　　*G01J 5/08*　　(2022.01)
(52) U.S. Cl.
　　CPC ............. *G01J 5/485* (2022.01); *G01J 5/0037* (2013.01); *G01J 5/0859* (2013.01)
(58) Field of Classification Search
　　CPC ........ G01J 5/485; G01J 5/0037; G01J 5/0859; Y02E 60/50
　　See application file for complete search history.

(56) References Cited

U.S. PATENT DOCUMENTS

| | | | |
|---|---|---|---|
| 2010/0268470 A1 | 10/2010 | Kamal et al. | |
| 2015/0323391 A1* | 11/2015 | McCulloch | F24H 9/2007 374/185 |
| 2022/0338392 A1* | 10/2022 | Watanabe | F01P 3/18 |
| 2023/0115653 A1* | 4/2023 | Gadelrab | G01J 5/0037 374/121 |

FOREIGN PATENT DOCUMENTS

| | | | | |
|---|---|---|---|---|
| CA | 1291552 C | * | 10/1991 | G02F 1/13475 |
| JP | 2023103665 A | * | 7/2023 | F01N 3/0857 |

OTHER PUBLICATIONS

Rasha, L., and et al. "Water distribution mapping in polymer electrolyte fuel cells using lock-in thermography." Journal of Power Sources 440 (2019): 227160 (Year: 2019).*

Robinson, James B., and et al. "Thermal imaging of electrochemical power systems: a review." Journal of Imaging 2, No. 1 (2016): 2 (Year: 2016).*

(Continued)

*Primary Examiner* — Douglas Kay

(74) *Attorney, Agent, or Firm* — Brooks Kushman P.C.

(57) ABSTRACT

A dimensional thermal fluid mapping system. The system includes an internal fluid device having one or more internal channels configured to contain a fluid. The internal fluid device has a first surface and an opposing second surface. The system includes an electrical device applying an electrical source of a voltage or current source to the first or second surface of the internal fluid device to induce a cycling change in an internal temperature of the internal fluid device. The system further includes a thermal measuring device configured to record a first temperature response on the first surface and a second temperature response on the second surface indicative of a dimensional thermal fluid mapping with the one or more channels.

20 Claims, 6 Drawing Sheets

(56) References Cited

OTHER PUBLICATIONS

Meyer, Quentin and et al. "The hydro-electro-thermal performance of air-cooled, open-cathode polymer electrolyte fuel cells: combined localised current density, temperature and water mapping." Electrochimica Acta 180 (2015): 307-315 (Year: 2015).*

Cardone, Gennaro, and et al. "Temperature maps measurements on 3D surfaces with infrared thermography." Experiments in fluids 52, No. 2 (2012): 375-385 (Year: 2012).*

Du, Kai, and et al. "Multifrequency induced-charge electroosmosis." Micromachines 10, No. 7 (2019): 447 (Year: 2019).*

Maraghechi, Borna and et al. "Temperature dependence of harmonics generated by nonlinear ultrasound beam propagation in water: A simulation study." In 2014 IEEE International Ultrasonics Symposium, pp. 1456-1459. IEEE, 2014 (Year: 2014).*

Engebretsen, E. et al., "Electro-thermal impedance spectroscopy applied to an open-cathode polymer electrolyte fuel cell," Journal of Power Sources, Nov. 11, 2015, vol. 302, pp. 210-214, DOI: 10.1016/j.jpowsour.2015.10.047.

Rasha, L. et al., "Water distribution mapping in polymer electrolyte fuel cells using lock-in thermography," Journal of Power Sources, Sep. 18, 2019, vol. 440, pp. 1-10, DOI: 10.1016/j.jpowsour.2019.227160.

Robinson, J. B. et al., "Detection of Internal Defects in Lithium-Ion Batteries Using Lock-in Thermography," ECS Electrochemistry Letters, Jul. 15, 2015, vol. 4, No. 9, pp. A106-A109, DOI: 10.1149/2.0071509eel.

Stumper, J. et al., "Diagnostic tools for liquid water in PEM fuel cells," Journal of Power Sources, Jan. 19, 2005, vol. 143, pp. 150-157, DOI:10.1016/j.jpowsour.2004.11.036.

* cited by examiner

NON-INVASIVE DIMENSIONAL THERMAL FLUID MAPPING SYSTEMS AND METHODS

TECHNICAL FIELD

The present disclosure relates to non-invasive dimensional thermal fluid mapping systems and methods.

BACKGROUND

Water management is often a consideration in internal systems with spatially distributed fluids. Examples of such internal systems include electrochemical cells (e.g., fuel cells and electrolyzers), radiators, and heat exchangers. Diagnostic techniques have been proposed to map water within these internal systems.

SUMMARY

Non-invasive dimensional thermal fluid mapping systems and methods are disclosed herein. These systems may be applied to electrochemical systems such as fuel cells and electrolyzers. The systems and methods may drive an electrical source of a voltage or current source of an electrochemical system in a harmonic form to produce small cycling changes in system temperature. Lock-in phase mapping may be employed on recorded temperature responses on the front and rear sides of the electrochemical system, for example, to provide high-resolution water distribution inside flow fields of the electrochemical system. Advantageously, the systems and methods of one or more embodiments operate without alteration to the structure of the electrochemical system or excitation by an external heating source.

DETAILED DESCRIPTION

Figure 1A:
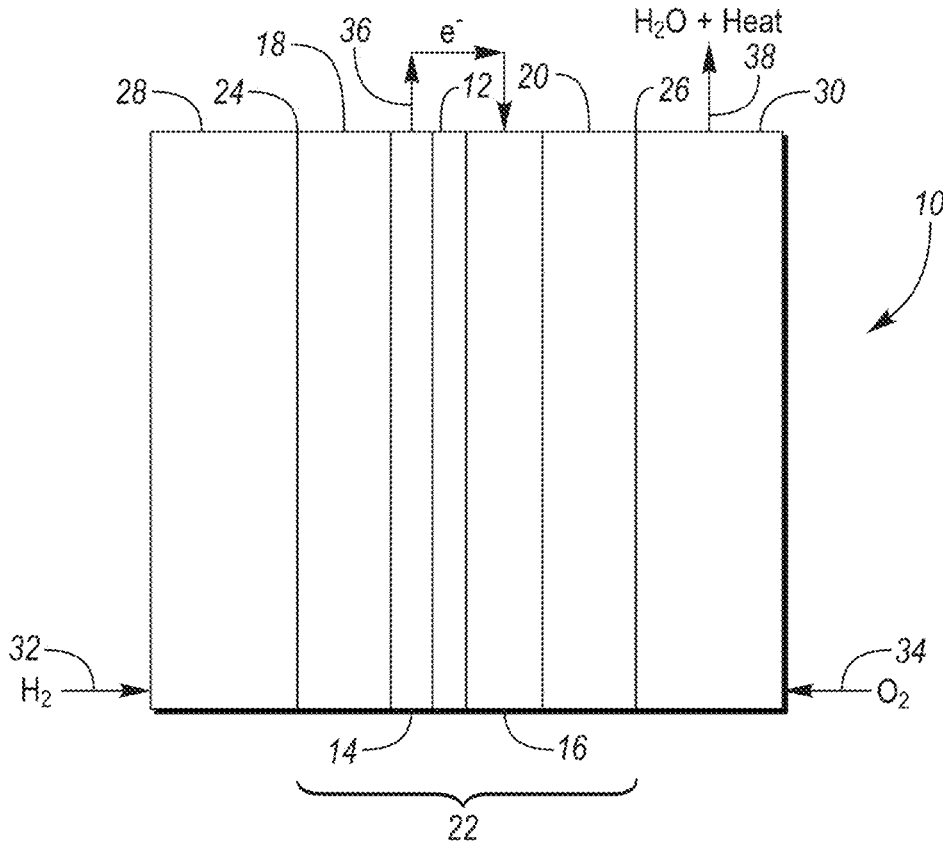
FIG. 1A depicts a schematic, side view of a fuel cell according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. These terms may be used to modify any numeric value disclosed or claimed herein. Generally, the term "about" denoting a certain value is intended to denote a range within +5% of the value. As one example, the phrase "about 100" denotes a range of 100±5, i.e., the range from 95 to 105. Generally, when the term "about" is used, it can be expected that similar results or effects according to the invention can be obtained within a range of +5% of the indicated value. The term "substantially" may modify a value or relative characteristic disclosed or claimed in the present disclosure. In such instances, "substantially" may signify that the value or relative characteristic it modifies is within +0%, 0.1%, 0.5%, 1%, 2%, 3%, 4%, 5% or 10% of the value or relative characteristic.

It should also be appreciated that integer ranges explicitly include all intervening integers. For example, the integer range 1 to 10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1 to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

As used herein, the term "and/or" means that either all or only one of the elements of said group may be present. For example, "A and/or B" means "only A, or only B, or both A and B". In the case of "only A", the term also covers the possibility that B is absent, i.e., "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Interest in hydrogen as an energy carrier has been growing in recent years as a viable option to decarbonize the transportation sector. Using electrochemical processes, a hydrogen fuel may be oxidized inside a fuel cell to produce electricity and water as a by-product. The reverse process, referred to as electrolysis, may be used to electrolyze water and produce hydrogen.

Many engineering challenges exist to achieve higher efficiency, reduced costs, and/or improved lifetime of electrochemical systems. One of these engineering challenges is water management within the electrochemical system. Water management strategies have been the subject of significant research and development efforts. In the context of fuel cells, an objective in the operation of proton exchange membrane fuel cells (PEMFCs) is to minimize the hydration levels to facilitate ionic transport through the membrane of the PEMFC. Excess liquid water in the PEMFC may cause deterioration in performance. This deterioration in performance may include voltage loss at high current density due to mass transport limitations, voltage instability at low current density, corrosion of the carbon in the catalyst support due to hydrogen starvation and/or pore blocking due to cathode flooding.

A fluid mapping system (e.g., water mapping system) may be located within an electrochemical system (e.g., a fuel cell or an electrolyzer). The fluid mapping system may be configured to map the amount of water within the electrochemical system to obtain water mapping data. The water mapping data may be used to improve (e.g., optimize) the performance of the electrochemical system. The water mapping data may also be used to evaluate lifetime characteristics of the electrochemical system (e.g., projected end of life and/or actual end of life). Obtaining water mapping data in a non-invasive manner while limiting modifications to the electrochemical system has proven challenging.

Fluid mapping systems providing in situ measurements while minimizing invasiveness are desired because of the transferability and the wide applicability of the results. However, lab scale equipment much less a commercial solution providing the capability of in situ measurements with minimal invasiveness within an electrochemical system are currently lacking.

An existing proposal uses multifrequency external thermal excitation to construct three dimensional (3D) maps of electrochemical system hydration levels given the depth dependence of the excitation phase shift. In one or more embodiments, this proposed system includes an external heating source and a thermal camera configured to measure the excitation phase shift.

Another proposal uses phase locking in a PEMFC. However, this proposal requires external stimulus, control algorithms, and thermal cameras to test a PEMFC. This proposal lacks a solution to water mapping an electrochemical system without the use of these three required elements.

Other proposals using variations of lock-in phase maps have been applied to electrochemical systems. For instance, one proposal images a new and aged Li-ion pouch cells by periodically pulsing a current to detect cracks and gas pockets in the Li-ion pouch cell. However, this proposal lacks the capability to provide a water mapping lock-in phase map to provide a high-resolution water distribution inside of a flow field of the electrochemical system.

Another proposal uses lock-in thermography on a PEMFC single cell using electro-thermal impedance spectroscopy (ETIS). This proposal may be used to visualize a location of heat generation within the single cell. According to this proposal, a periodic electrical stimulus is induced during operation, thereby altering the rate of heat generation in the cell due to the altered rate of electrochemical reaction. However, this proposal does not drive an electrical source of a voltage or current source of an electrochemical system in a harmonic form to produce a relatively small cycling change in an electrochemical system temperature.

What is needed is a water mapping system that is (a) non-invasive to the electrochemical system and/or (b) limits modifications to standard electrochemical systems. In one embodiment, a fluid mapping system is configured to drive an electrical source (e.g., voltage or current) of an electrochemical system in a harmonic form to produce a relatively small cycling change in an electrochemical system temperature. The fluid mapping system may be further configured to store (e.g., record) the electrochemical system temperature on one or more exposed surfaces of the electrochemical system (e.g., one or more front surfaces and/or one or more back surfaces) in response to the relatively small cycling change over time. The stored electrochemical system temperatures over time may be used to generate a lock-in phase map to provide a high-resolution water distribution inside a flow field of the electrochemical system. The lock-in phase map may be used to visualize a signal phase relative to a reference frequency. The electrochemical system temperatures over time may be recorded using one or more thermal cameras without alteration of the electrochemical system or excitation by an external heating source (e.g., a Peltier module, a resistive filament, or a halogen lamp).

In one or more embodiments, a water mapping system for an electrochemical system (e.g., fuel cell or electrolyzer) is disclosed that uses internal heating (e.g., heat generated during testing and/or operation of the fuel cell) of the electrochemical system to map a water distribution in a flow field of the electrochemical cell. The self-heating capability of the electrochemical cell may be used as a reference signal to achieve phase locking. By applying an external voltage harmonically, a corresponding temperature variation and a heat flux travels between the electrodes (e.g., from the anode to the cathode) across the electrochemical system. The surface temperature of the flow fields (e.g., the cathode flow fields in the case of a fuel cell) is recorded using a thermal camera and is referenced to the opposite side of the electrochemical system to achieve phase locking. The phase angle between the applied voltage and the recorded response provides a two-dimensional (2D) map of water and air distribution within the flow field. A temperature field at a rear side of the cathode plate is recorded using a thermal camera where the phase locking state is calculated with reference to the front plate of the PEMFC. A final phase map highlights water and gas distribution in the cathode flow field indicating water accumulation or blockage. Depth dependence may be obtained by introducing relatively higher harmonics to the applied voltage. The relatively higher harmonics may be any of the following values or in a range of any two of the following values: 0.05, 0.10, 0.15, 0.20, 0.25, 0.30, 0.35, 0.40, 0.45, and 0.50 Hz. In one or more embodiments, the fluid mapping system is configured to supply a multifrequency excitation of voltage to provide depth dependent water mapping including a three-dimensional (3D) reconstruction of water inside the flow field. The multifrequency excitation may provide multiple points of reference for tracking to improve accuracy and precision.

FIG. 1A depicts a schematic, side view of fuel cell 10 according to one embodiment. The fluid mapping systems of one or more embodiments may be applied to fuel cell 10. Fuel cell 10 can be stacked to create a fuel cell stack. Fuel cell 10 includes polymer electrolyte membrane (PEM) 12, anode 14, cathode 16 and first and second gas diffusion layers (GDLs) 18 and 20. PEM 12 is situated between anode 14 and cathode 16. Anode 14 is situated between first GDL 18 and PEM 12 and cathode 16 is situated between second GDL 20 and PEM 12. PEM 12, anode 14, cathode 16 and first and second GDLs 18 and 20 comprise membrane electrode assembly (MEA) 22. First and second sides 24 and 26 of MEA 22 is bounded by flow fields 28 and 30, respectively. Flow field 28 supplies $H_2$ to MEA 22, as signified by arrow 32. Flow field 30 supplies $O_2$ to MEA 22, as signified by arrow 34. A catalyst material, such as platinum, is used in anode 14 and cathode 16. The catalyst material is commonly the most expensive constituent of MEA 22.

Figure 1B:
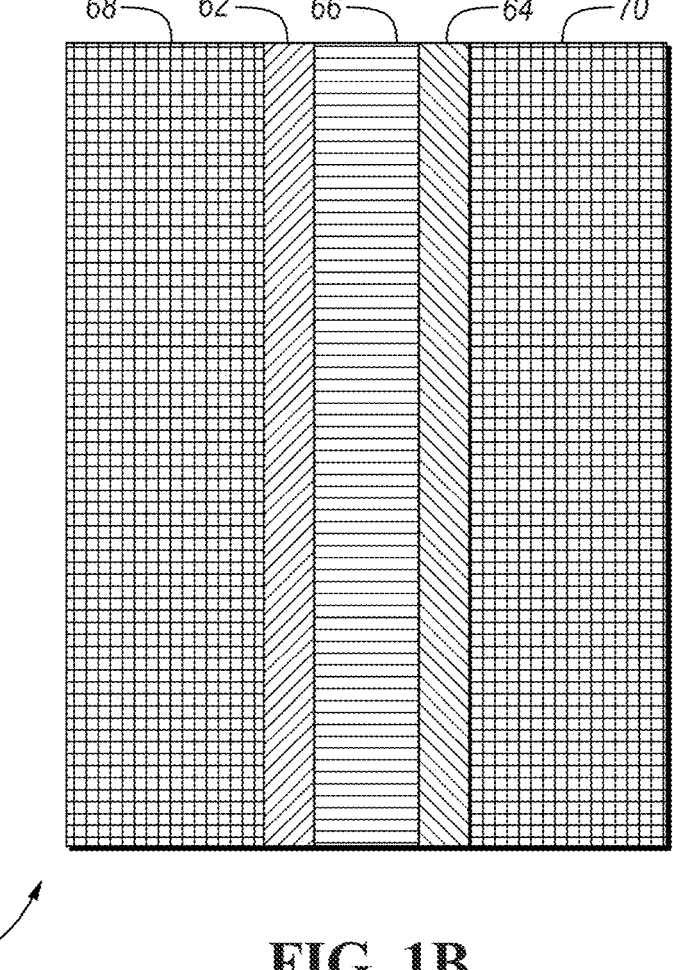
FIG. 1B depicts a schematic side view of an electrolyzer according to one embodiment.

FIG. 1B depicts a schematic side view of electrolyzer 60 according to one embodiment. Electrolyzers undergo an electrolysis process to split water into hydrogen and oxygen, providing a promising method for hydrogen generation from renewable resources. Electrolyzer 60 includes anode catalyst layer 62 and cathode catalyst layer 64 separated by electrolyte membrane 66. A catalyst material is included in anode catalyst layer 62 and cathode catalyst layer 64. Electrolyte membrane 66 may be a polymer, an alkaline solution, or a solid ceramic material. Porous transport layer 68 contacts the surface of anode catalyst layer 62 opposing electrolyte membrane 66. Gas diffusion media 70 contacts the surface of cathode catalyst layer 64 opposing electrolyte membrane 66. Oxygen evolution (OER) occurs at anode catalyst layer 62 and hydrogen evolution (HER) occurs at cathode catalyst layer 64 with $H^+$ ions flowing across electrolyte membrane 66 from anode catalyst layer 62 to cathode catalyst layer 64.

While FIGS. 1A and 1B depict a PEMFC and an electrolyzer, respectively, one or more embodiments of fluid mapping systems may be applied to any type of electrochemical system (e.g., a water electrolyzer or a carbon dioxide electrochemical conversion device). The fluid mapping systems may also be applied for internal water mapping and blockage detection in a piping system such as a radiator or a heat exchanger. The fluid mapping systems and methods may be used to locate water packets inside of one or more electrochemical systems, thereby providing real-time responses and feedback for control systems during operation of the electrochemical systems.

Figure 2:
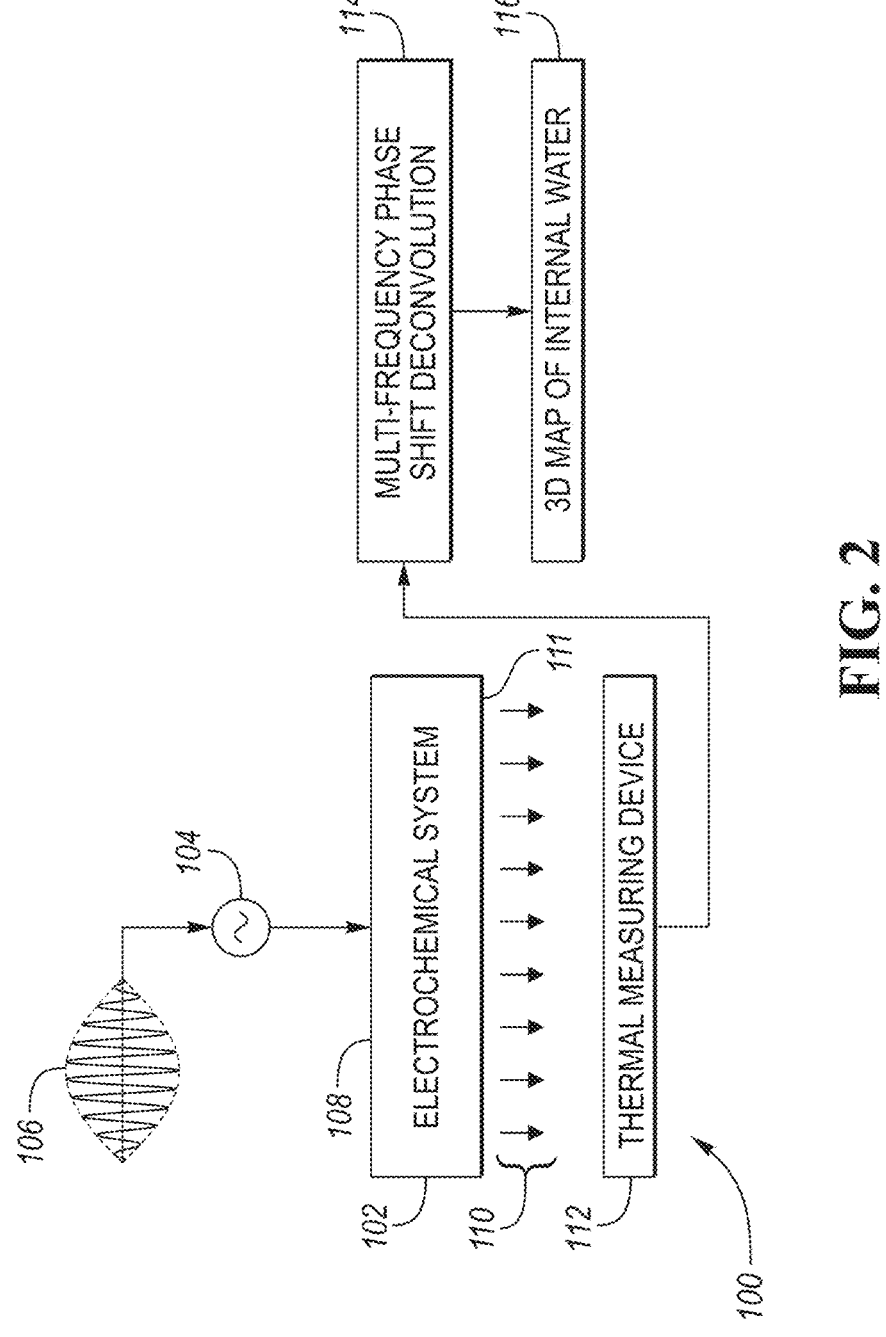
FIG. 2 is a schematic diagram of a thermal measurement system according to an embodiment.

FIG. 2 is a schematic diagram of thermal measurement system 100 according to an embodiment. Thermal measurement system 100 may be configured to generate a three-dimensional (3D) map of a water distribution inside electrochemical system 102 having an internal water flow path. Electrochemical system 102 is configured to generate heat internally through its operation. Thermal measurement system 100 may be configured to use this internally generated with specific frequency packets to excite a depth dependent thermal response that may be mapped into a three-dimensional (3D) water map.

As shown in FIG. 2, thermal measurement system 100 applies electrical source 104 driven by multifrequency signal 106 to drive a thermal signal through first side 108 of electrochemical system 102 and the width of electrochemical system 102 to produce a heat signal 110 exiting second, opposing side 111 of electrochemical system 102. Electrical source 104 may be a voltage oscillation of up to 0.25 volts or a current oscillation of up to 1 A/cm². Application of electrical source 104 may be configured to induce heating of an electrochemical system.

Thermal measurement system 100 also includes thermal measuring device 112 (e.g., a thermal camera). Thermal measuring device 112 is configured to receive heat signal 110 and generate a temperature map in response to receiving heat signal 110. A controller (not shown) is configured to receive the receive the temperature map and perform a multifrequency phase shift deconvolution on the temperature map to obtain multifrequency please shift deconvoluted temperature map data according to operation 114. The controller may be further configured to generate a 3D map of internal water in electrochemical system 102 based on the multifrequency phase shift deconvoluted temperature map data according to operation 116. The controller may be included in the thermal measuring device. Once or more controllers may be configured to perform the steps identified herein.

In one embodiment, a three-dimensional (3D) transient thermal simulation (e.g., a finite element analysis) is applied to a thin polymer sheet sandwiched between first and second graphite plates having first and second flow field channels mimicking a PEMFC to demonstrate the applicability of lock-in thermography to an electrochemical system having conductive flow field plates (e.g., bipolar plates).

Figure 3A:
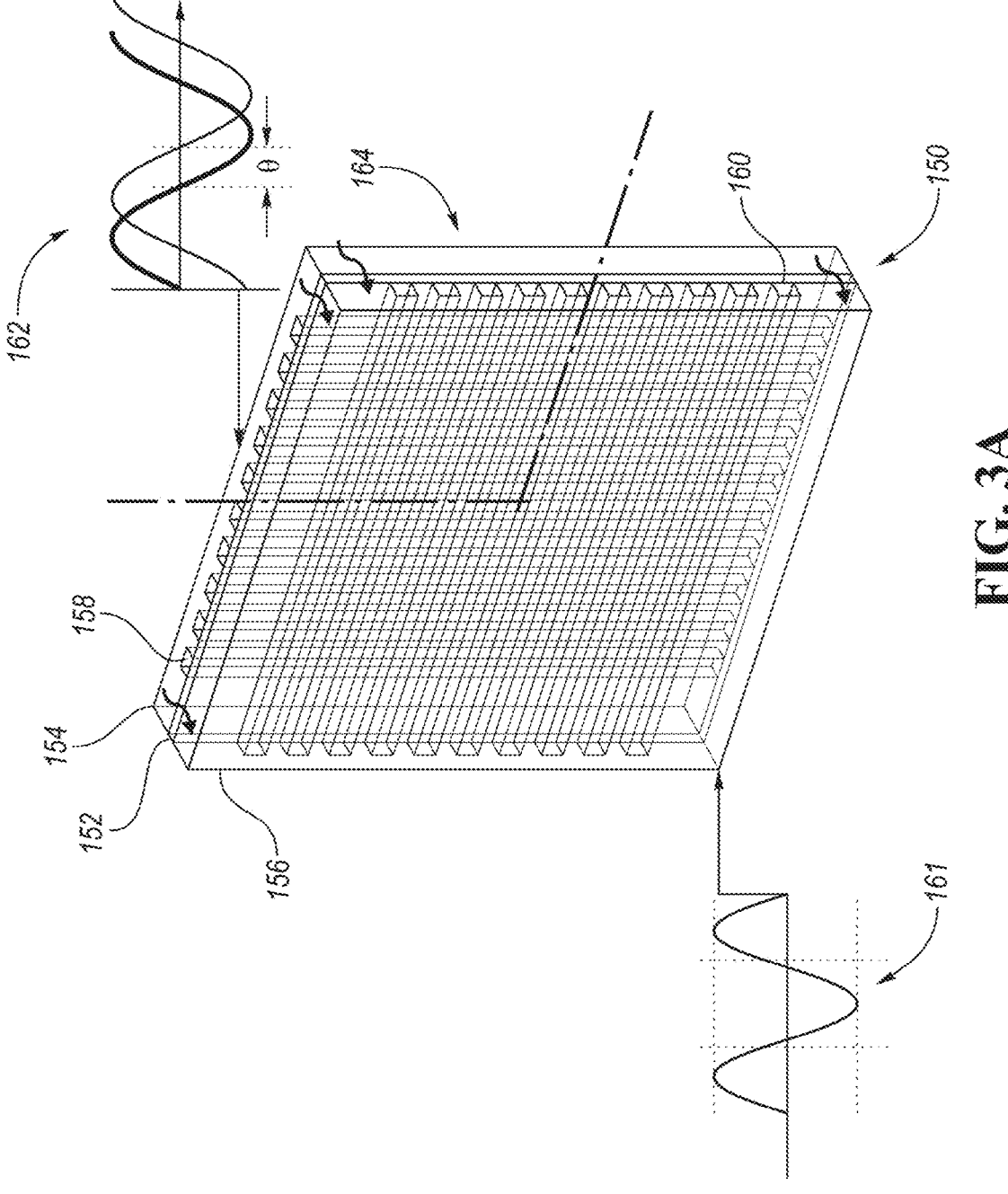
FIG. 3A depicts a schematic, perspective view of a polymer membrane between a first graphite plate and a second graphite plate.

FIG. 3A depicts a schematic, perspective view of fuel cell 150 including polymer membrane 152 between first graphite plate 154 (e.g., front plate) and second graphite plate 156 (e.g., second plate). Graphite plate 154 includes first channels 158 and second graphite plate 156 includes second channels 160. As shown in FIG. 3A, first channels 158 extend vertically and second channels 160 extend horizontally forming a crossflow set up.

The cell size of fuel cell 150 used in the simulation is $25 \times 25$ mm$^2$. The channel size (e.g., profile) of first channels 158 and second channels 160 used in the simulation is $1 \times 1$ mm$^2$. As shown in FIG. 3A, the number of first channels 158 and second channels 160 used in the simulation is 10. Table 1 shown below provides material properties employed in the simulation.

TABLE 1

| Material Property | K [W/m · K] | C [J/kg · K] | P [kg/m$^3$] |
|---|---|---|---|
| Graphite | 10 | 800 | 1500 |
| Polymer | 0.03 | 1100 | 830 |
| Air | 0.02 | 1003.5 | 1.2 |
| Water | 0.6 | 4187 | 1000 |

Figure 3B:
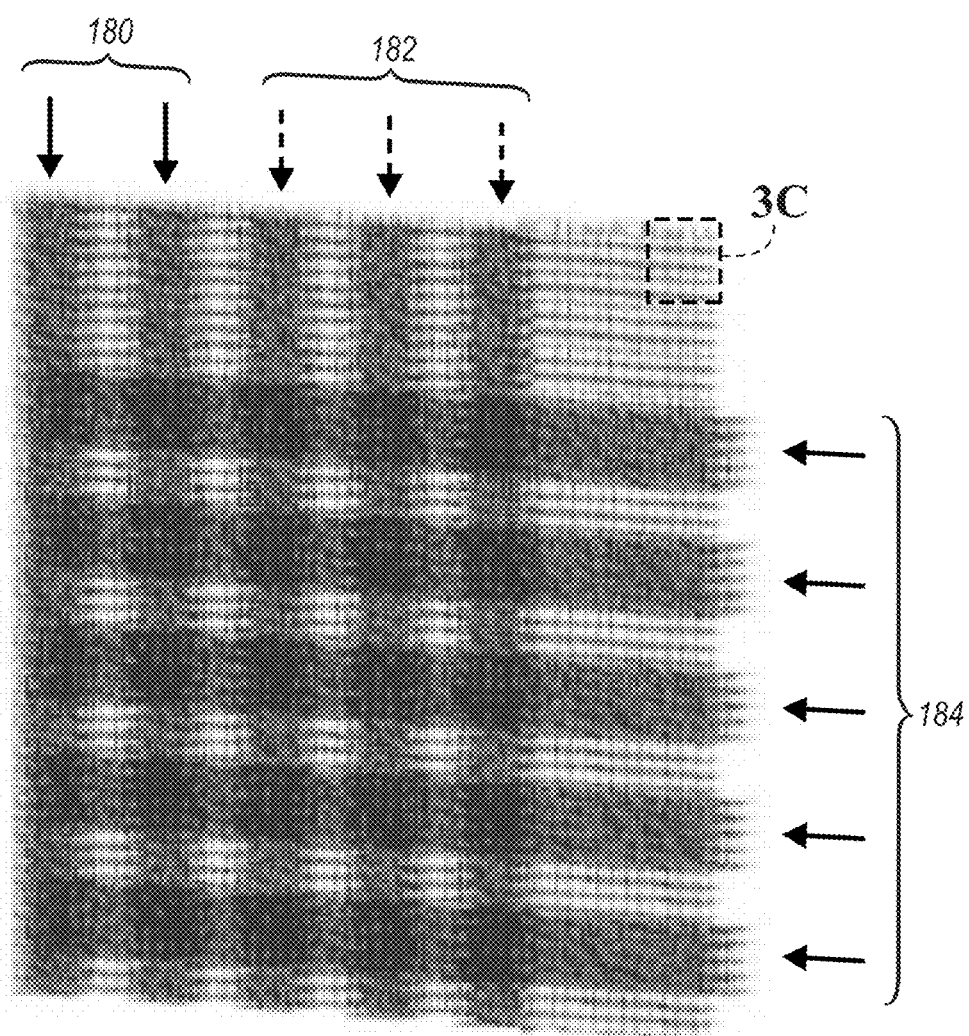
FIG. 3B depicts a schematic view of the upper right quadrant of the fuel cell showing air and water flow as part of a simulation.
Figure 3C:
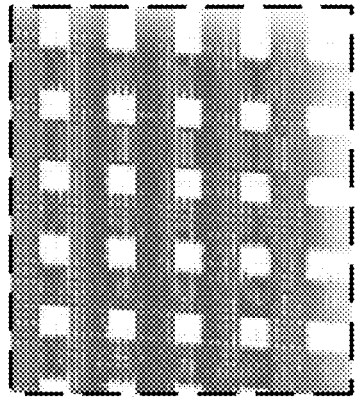
FIG. 3C depicts a schematic front view of the meshed channels of the fuel cell shown in FIGS. 3A and 3B.

FIG. 3B depicts a schematic view of the upper right quadrant 164 of fuel cell 150 showing air or water flow as part of the simulation. FIG. 3C depicts a schematic front view of the meshed channels of the fuel cell shown in FIGS. 3A and 3B. The flow fields are removed from FIGS. 3B and 3C for clarity. First and second channels 158 and 160 used in the simulation represent flow fields and are simulated to have the properties of either water or air. Solid arrows 180 reference air flow through vertical first channels 158 and dotted arrows 182 reference water flow through vertical first channels 158. Solid arrows 184 reference air flow through horizontal second channels 160. As part of the simulation, air flows through all the horizontal second channels 160. The front flow field (i.e., first channel 158) has air flowing in the four middle vertical channels, while water flows in the outer channels as indicated by arrows 180 and 182. Due to its symmetry, only one quarter of the system is simulated. The air side flow field has its temperature cycled as represented by graph 161 and a temperature of the opposite flow field of first graphite plate 154 is recorded. The second graphite plate 161 may be subjected to a sinusoidal temperature boundary condition with 10° C. in amplitude and a predetermined frequency. The phase shift between the two surfaces of fuel cell 150 may calculated and mapped as shown in graph 162. As part of the simulation, convective heat loss is applied to all free surfaces. The scenario presented in FIGS. 3A through 3C are relevant to confirming the ability of phase locking to distinguish different fluids inside the different channels 158 and 160.

Figures 4A, 4B:
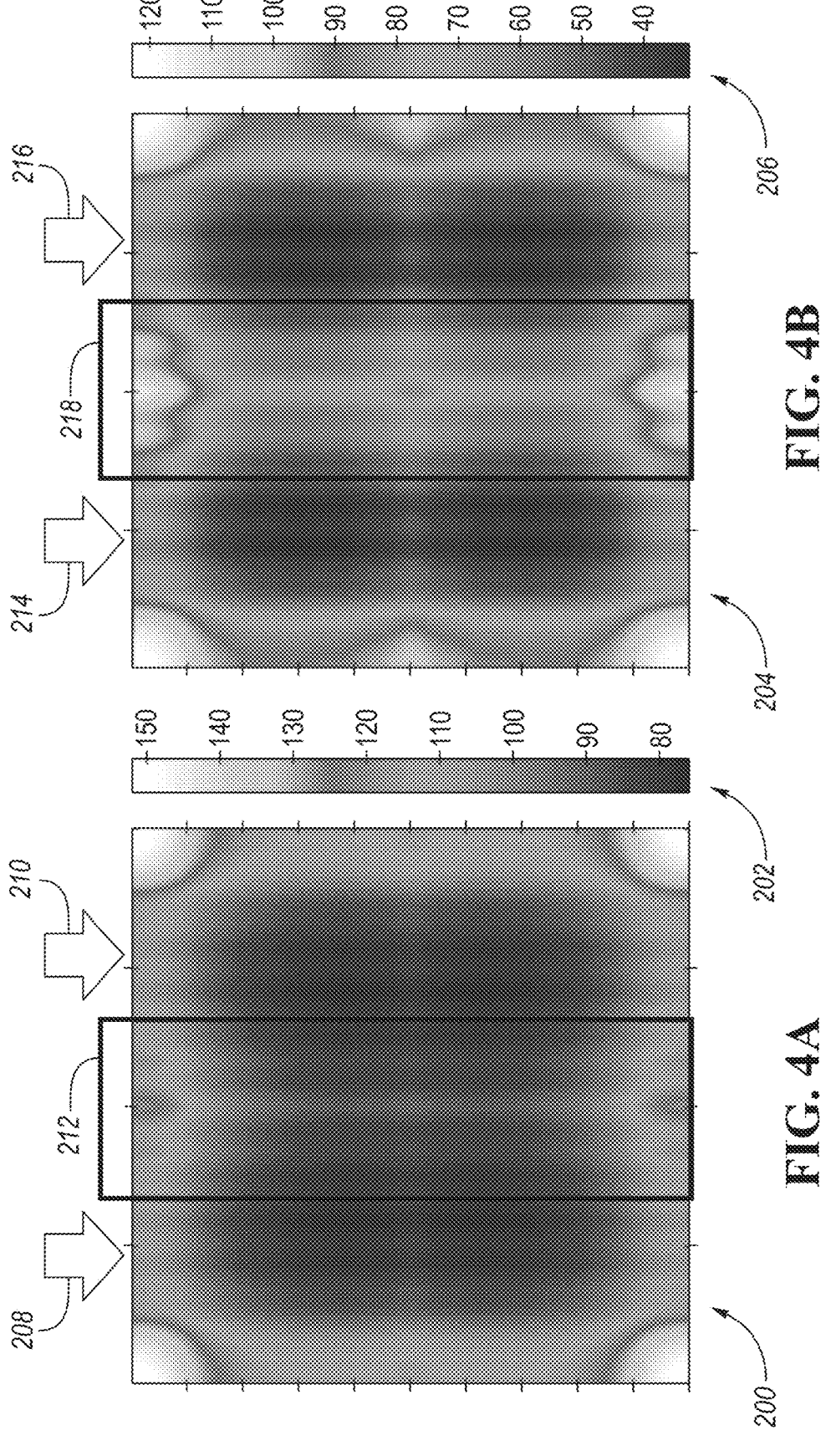
FIG. 4A depicts a surface map of phase shift in degrees recorded from a front face of a fuel cell with a first stimulation frequency.
FIG. 4B depicts a surface map of phase shift in degrees recorded from a front face of a fuel cell with a second stimulation frequency.

FIG. 4A depicts surface map 200 in degrees shown by legend 202 recorded from a front face of fuel cell 150 using the simulation identified above at a first stimulation frequency. FIG. 4B depicts surface map 204 in degrees shown by legend 206 recorded from the front face of fuel cell 150 using the simulation identified above at a second stimulation frequency. On FIG. 4A, arrows 208 and 210 indicate outer water channels in the vertical channels of fuel cell 150 and rectangle 212 indicates inner air channels in the vertical channels of fuel cell 150. On FIG. 4B, arrows 214 and 216 indicate outer water channels in the vertical channels of fuel cell 150 and rectangle 218 indicates inner air channels in the vertical channels of fuel cell 150. FIGS. 4B (and FIG. 4A to a relatively lesser extent) clearly contrasts water channels from air channels through significantly different phase values. For example, in FIG. 4B, the range of phase values for the water channels are in a range of 40 to 50 degrees while the range of phase values for the air channels are in a range of 65 to 75 degrees. As shown in FIGS. 4A and 4B, the air channels have higher phase angles than the water channels.

As a result of the simulation, the phase locking shows a reasonable resolution with discernable 1 mm wide channels. In one or more embodiments, features with the following dimensions (e.g., width, height and/or length) may be discernable by the phase locking of one or more embodiments: 0.8, 0.9, 1.0, 1.1, and 1.2 millimeters.

The frequency of temperature cycling in an electrochemical system is relatively low (about 0.1 Hz) based on the thermal diffusivity of the electrochemical system. Faster oscillations of temperature might provide better phase contrast but a significant reduction in temperature magnitude, thereby making it challenging for the thermal measuring device (e.g., thermal camera) to discern. Slower oscillations provide larger changes in temperature amplitude on the front surface, but it may create lateral (e.g., in-plane) heat transfer which reducing resolution and washing away phase contrast. One or more embodiments use a frequency of temperature considering these competing factors to obtain beneficial results. The frequency of temperature may be any of the following values or in a range of any two of the following values: 0.05, 0.10, 0.15, 0.20, 0.25, 0.30, 0.35, 0.40, 0.45, and 0.50 Hz.

In one or more embodiments, boundary effects may significantly impact the phase map. The edge channels may not be as clearly visible as the middle channels, thereby localizing measurement accuracy in a center portion of the flow field. While the results demonstrated in FIGS. 4A and 4B are for a single harmonic excitation, a multi-frequency excitation using an algorithm may be achieved by having a series of oscillation packets that are applied in a serial fashion back to back, or it can be applied using a multi-harmonic excitation where a step function or a Gaussian packet of excitation is directly applied and the output results are analyzed as a function of the frequency content of the excitation. While the first approach there is only a single harmonic at a time to analyze, it may take a longer time to run the complete frequency sweep (e.g., in a single run). The latter approach is faster to apply, however, power redistribution between different harmonics would require more sophisticated algorithm to deconvolute the recorded signals and construct the frequency dependent phase map.

One or more embodiments demonstrate a non-destructive, non-invasive approach to provide in-situ mapping of an internal structural change (e.g., accumulation of liquid water in the flow field channel) of an electrochemical system without using an external heating source by only relying on an external electric drive and internal heating of the electrochemical system. These results indicate the ability of a phase signal differentiating between heat paths with different thermal properties to detect air bubbles or flow blockages in a cathode side of a fuel cell. These results confirm the impressive sensitivity of one or more embodiments.

The following application is related to the present application: U.S. patent application Ser. No. 17/499,262 filed on Oct. 12, 2021, which is incorporated by reference herein in its entirety.

The processes, methods, or algorithms (e.g., recording a first temperature response on a first surface of an internal fluid device and a second temperature response on a second surface in response to a cycling change in an internal temperature, generating a dimensional thermal fluid mapping of the internal fluid device in response to the first and second temperature responses over time) disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A dimensional thermal fluid mapping system comprising:
   an internal fluid device having one or more internal channels configured to contain a fluid, the internal fluid device having a first surface and a second surface opposing the first surface;
   an electrical device applying a series of signals at oscillating frequencies over time using a step function or a Gaussian packet from an electrical source in a harmonic form to the first or second surface of the internal fluid device to induce a cycling change in an internal temperature of the internal fluid device; and
   a thermal measuring device configured to record a first temperature response on the first surface and a second temperature response on the second surface indicative of a dimensional thermal fluid mapping within the one or more internal channels.

2. The dimensional thermal fluid mapping system of claim 1, wherein the internal fluid device is an electrochemical system.

3. The dimensional thermal fluid mapping system of claim 2, wherein the electrochemical system is selected from the group consisting of a fuel cell, a water electrolyzer, and a carbon dioxide electrochemical conversion device.

4. The dimensional thermal fluid mapping system of claim 1, wherein the thermal measuring device is a thermal camera.

5. The dimensional thermal fluid mapping system of claim 1, wherein the electrical source is a voltage oscillation up to 0.25 volts.

6. The dimensional thermal fluid mapping system of claim 1, wherein the electrical source is a current oscillation up to $1 \text{ A/cm}^2$.

7. The dimensional thermal fluid mapping system of claim 1, wherein the internal fluid device is a radiator or a heat exchanger.

8. The dimensional thermal fluid mapping system of claim 1, wherein the cycling change in the internal temperature is not induced by an external heating device.

9. The dimensional thermal fluid mapping system of claim 1, wherein the oscillating frequencies include frequencies in a range of 0.05 to 0.50 Hz.

10. A dimensional thermal fluid mapping method comprising:
   applying a series of signals at oscillating frequencies over time using a Gaussian packet in a harmonic form to a first surface or a second surface of an internal fluid device having one or more internal channels configured to contain a fluid, the second surface opposing the first surface, the applying step inducing a cycling change in an internal temperature of the internal fluid device;
   recording a first temperature response on the first surface and a second temperature response on the second surface in response to the cycling change in the internal temperature of the internal fluid device; and
   generating a dimensional thermal fluid mapping of the internal fluid device in response to the first and second temperature responses.

11. The dimensional thermal fluid mapping method of claim 10, further comprising detecting an internal fluid distribution condition from the dimensional thermal fluid mapping.

12. The dimensional thermal fluid mapping method of claim 11, wherein the internal fluid condition is a block of water quality in one or more of the internal channels.

13. The dimensional thermal fluid mapping method of claim 11, further comprising controlling an operation state of the internal fluid device in response to the internal fluid condition.

14. The dimensional thermal fluid mapping method of claim 10, wherein the internal fluid device is a cathode of a fuel cell.

15. The dimensional thermal fluid mapping method of claim 10, wherein the fluid is air and/or water.

16. A dimensional thermal fluid mapping method comprising:

applying a series of signals at oscillating frequencies over time using a step function to a first surface or a second surface of an internal fluid device having one or more internal channels configured to contain a fluid, the second surface opposing the first surface, the applying step inducing a cycling change in an internal temperature of the internal fluid device;

recording a first temperature response on the first surface and a second temperature response on the second surface in response to the cycling change in the internal temperature of the internal fluid device; and generating a three-dimensional thermal fluid mapping of the internal fluid device in response to the first and second temperature responses.

17. The dimensional thermal fluid mapping method of claim 16, further comprising detecting an internal fluid distribution condition from the dimensional thermal fluid mapping.

18. The dimensional thermal fluid mapping method of claim 17, wherein the internal fluid condition is a block of water quality in one or more of the internal channels.

19. The dimensional thermal fluid mapping method of claim 17, further comprising controlling an operation state of the internal fluid device in response to the internal fluid condition.

20. The dimensional thermal fluid mapping method of claim 16, wherein the applying step is performed in a single run.

* * * * *